US011944919B2

(12) United States Patent
    Patton

(10) Patent No.: US 11,944,919 B2
(45) Date of Patent: Apr. 2, 2024

(54) SURFACE EVAPORATION SYSTEM

(71) Applicant: HYDROZONIX, LLC, Conroe, TX (US)

(72) Inventor: Mark Patton, Conroe, TX (US)

(73) Assignee: HYDROZONIX, LLC, Conroe, TX (US)

( * ) Notice: Subject to any disclaimer, the term of this patent is extended or adjusted under 35 U.S.C. 154(b) by 0 days.

(21) Appl. No.: 17/879,716

(22) Filed: Aug. 2, 2022

(65) Prior Publication Data

US 2023/0032611 A1    Feb. 2, 2023

Related U.S. Application Data

(60) Provisional application No. 63/351,415, filed on Jun. 12, 2022, provisional application No. 63/228,270, filed on Aug. 2, 2021.

(51) Int. Cl.
    *B01D 1/20*    (2006.01)
    *B01D 1/30*    (2006.01)
    (Continued)

(52) U.S. Cl.
    CPC .............. *B01D 1/20* (2013.01); *B01D 1/30* (2013.01); *B01D 3/006* (2013.01); *C02F 1/12* (2013.01); *C02F 1/36* (2013.01); *C02F 2103/10* (2013.01)

(58) Field of Classification Search
    CPC .. B01D 1/20; B01D 1/30; B01D 3/006; C02F 1/12; C02F 1/36; C02F 2103/10
    See application file for complete search history.

(56) References Cited

U.S. PATENT DOCUMENTS 4,428,842 A * 1/1984 House ............... E21B 41/005
                                             210/750
4,762,276 A * 8/1988 Foust ................... B01D 1/16
                                             405/129.1

(Continued)

FOREIGN PATENT DOCUMENTS

| CA | 2840293 A1 * | 7/2014 | ............ C02F 1/36 |
| WO | WO-2008104172 A2 * | 9/2008 | ............ B01D 1/18 |
| WO | WO-2019043982 A1 * | 3/2019 | ............ B01D 1/20 |

OTHER PUBLICATIONS

International Search Report and Written Opinion, PCT/US22/39212, Hydrozonix, LLC (dated Aug. 2, 2022).

*Primary Examiner* — Jonathan Miller
(74) *Attorney, Agent, or Firm* — Wayne Edward Ramage; Baker Donelson

(57) ABSTRACT

An improved surface evaporation system where droplet size and spray configuration is controlled and modified based upon ambient conditions in order to prevent the spreading of salts and other contaminants outside of a treatment pit or specific area. Water droplet size can be controlled by adjustment of the spray nozzle side. Increasing the nozzle size to increase droplet size results in a reduction of mist travel direction (i.e., drift distance). Reducing the nozzle size decreases the droplet size, and increases drift distance. Similarly, changing the configuration of the spray will affect drift distance. For example, changing the spray direction and height from a vertical spray direction to a flatter, more horizontal direction (with resulting greater area) results in a substantially decreased drift distance. In addition, the system also takes into account the effects of wind speed and direction and humidity. Evaporation modules may use standard spray nozzles, or ultrasonic evaporators.

10 Claims, 21 Drawing Sheets

(51) Int. Cl.
*B01D 3/00* (2006.01)
*C02F 1/12* (2023.01)
*C02F 1/36* (2023.01)
*C02F 103/10* (2006.01)

(56) References Cited

U.S. PATENT DOCUMENTS

| | | | | |
|---|---|---|---|---|
| 7,604,710 | B2* | 10/2009 | Haslem | B01D 1/20 |
| | | | | 405/224.1 |
| 8,256,748 | B1* | 9/2012 | Boulter | E21B 41/005 |
| | | | | 261/78.2 |
| 9,504,932 | B2* | 11/2016 | Noel | C02F 1/048 |
| 10,519,044 | B2* | 12/2019 | Noles, Jr. | B01F 23/23121 |
| 2007/0227674 | A1* | 10/2007 | Haslem | E21B 21/063 |
| | | | | 159/3 |
| 2010/0139871 | A1* | 6/2010 | Rasmussen | B01D 1/20 |
| | | | | 159/4.01 |
| 2014/0174672 | A1* | 6/2014 | Boulter | E21B 41/005 |
| | | | | 159/4.2 |
| 2014/0262055 | A1* | 9/2014 | Noel | C02F 1/048 |
| | | | | 261/78.2 |
| 2016/0325202 | A1* | 11/2016 | Phillips | C02F 1/048 |
| 2017/0073247 | A1* | 3/2017 | Noel | C02F 1/12 |
| 2018/0186659 | A1* | 7/2018 | Noles, Jr. | B01D 3/346 |

* cited by examiner

| | A | B | C | D |
|---|---|---|---|---|
| 1 | Parameter | Value | Unit | |
| 2 | Wind Speed | 10 | *MPH* | |
| 3 | Height | 5 | *ft* | |
| 4 | Relative Humidity | 60 | *%* | |
| 5 | Temperature | 86 | *F* | |
| 6 | Droplet Size | 500 | *μm* | |
| 7 | Nozzle Velocity | 1.64 | *FPS* | |
| 8 | | | | |
| 9 | | | | |
| 10 | | | | |
| 11 | | | | |
| 12 | | | | |
| 13 | DRIFT DISTANCE | 21.45 ft | | |
| 14 | | | | |
| 15 | | | | |
| 16 | | | | |

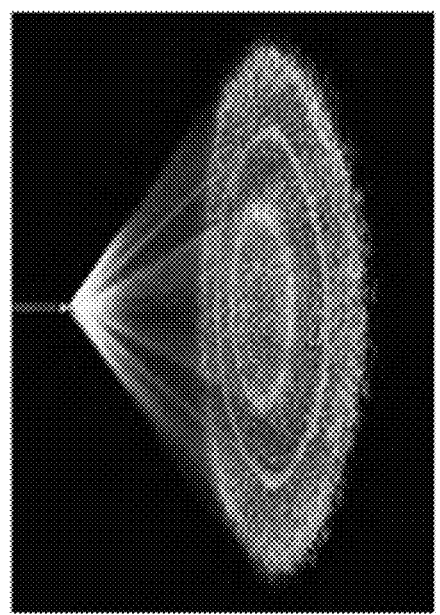
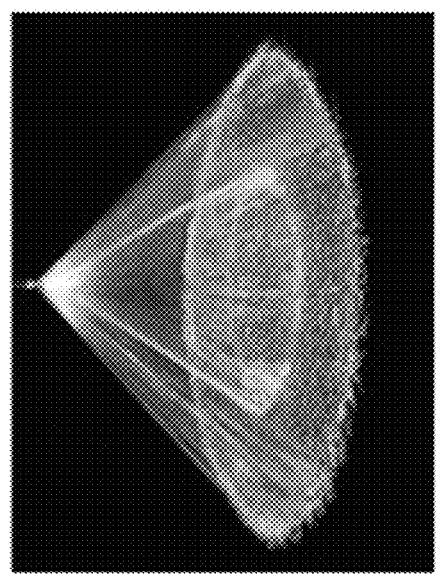
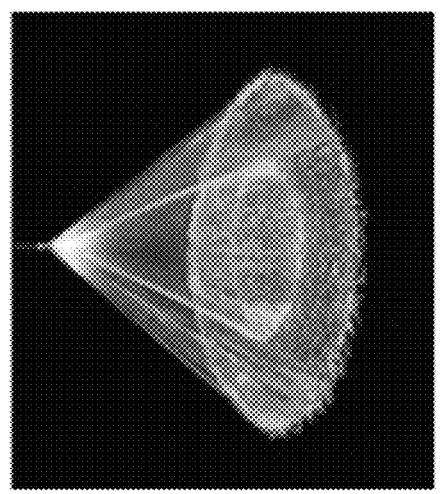
FIG. 6

SURFACE EVAPORATION SYSTEM

This application claims benefit of and priority to U.S. Provisional App. No. 63/228,270, filed Aug. 2, 2021, and U.S. Provisional App. No. 63/351,415, filed Jun. 12, 2022. U.S. Provisional App. Nos. 63/228,270 and 63/351,415 are incorporated herein in their entireties by specific reference for all purposes.

BACKGROUND OF THE INVENTION

Produced water is a byproduct of oil and gas exploration and production. It primarily consists of formation water that gets comingled with oil and gas and is then subsequently separated at the wellhead. Produced water can have very high dissolved solids, organics, metals and solids. The high levels of dissolved solids, primarily salts make produced water difficult to process with conventional treatment methodologies.

Surface evaporation methods typically involve spraying water through spray nozzles that spray the water or fluid vertically to maximize the evaporation rate. However, when the fluid is produced water (large volumes of water generated by a variety of oil and gas operations mixed with hydrocarbons and various contaminants, which are generally referred to in the industry as "produced water"), this form of evaporative spraying poses a problem. Most produced water is contaminated with inorganic salts, metals, organic compounds, and other materials, such as emulsifiers or other agents that may be injected for various types of enhanced recovery operations. Typical hydrocarbons in produced water include semivolatile organic compounds ("SVOCs") and volatile organic compounds ("VOCs"). As produced water evaporates, it leaves a salt residual that spreads with the water mist as it travels, and thus often contaminates the surrounding environment. The residual salt and solids get dispersed and have the potential of causing surface contamination around the produced water source or location of the surface evaporation. Recently induced seismicity concerns have reduced the capacity and number of disposal injection wells putting increased pressure on alternatives to disposal injection wells.

Accordingly, what is needed is an improved surface evaporation system that prevents the spreading of salts and other contaminants.

SUMMARY OF THE INVENTION

In various exemplary embodiments, the present invention comprises an improved surface evaporation system where droplet size and spray configuration is controlled and modified based upon ambient conditions in order to prevent the spreading of salts and other contaminants outside of a treatment pit or specific area. The distance and direction water mist or vapor travels is a function primarily of water droplet size (larger droplet size causes reduced mist or vapor travel distance), wind direction and strength/speed, and humidity, although temperature also can play a role. Water droplet size can be controlled by adjustment of the spray nozzle size. Increasing the nozzle size to increase droplet size results in a reduction of mist travel direction (i.e., drift distance). Reducing the nozzle size decreases the droplet size, and increases drift distance.

Similarly, changing the configuration of the spray will affect drift distance. For example, changing the spray direction and height from a vertical spray direction to a flatter, more horizontal direction (with resulting greater area) results in a substantially decreased drift distance.

In addition, the system also takes into account the effects of wind speed and direction and humidity. Testing has resulted in a model to estimate drift distance from all the above factors. The system detects ambient humidity (with humidity sensors) and wind speed and direction (with an anemometer) in the vicinity of the evaporator module and/or pit and controls the water velocity at the nozzle to control flowrate, thereby controlling the drift distance. For produced water applications, where evaporation takes place in large surface impoundments or pits, the system controls the drift distance so the mist and salts settle within the pit, and do not move to surrounding land. This ultimately concentrates the water in the impoundment for later disposal, thereby enhancing natural evaporation and increasing the water management capacity of the product water treatment program, ultimately reducing the volume of water requiring disposal.

DESCRIPTION OF THE DRAWINGS

FIG. 5 shows an example of a drift distance determination.

FIG. 6 shows an example of spray cone angles and widths.

DETAILED DESCRIPTION OF EXEMPLARY EMBODIMENTS

In various exemplary embodiments, the present invention comprises an improved surface evaporation system where droplet size and spray configuration is controlled and modified based upon ambient conditions in order to prevent the spreading of salts and other contaminants outside of a treatment pit or specific area. The distance and direction water mist or vapor travels is a function primarily of water droplet size (larger droplet size causes reduced mist or vapor travel distance), wind direction and strength/speed, and humidity, although temperature also can play a role. Water droplet size can be controlled by adjustment of the spray nozzle size. Increasing the nozzle size to increase droplet size results in a reduction of mist or vapor travel direction (i.e., drift distance). Reducing the nozzle size decreases the droplet size, and increases drift distance.

Similarly, changing the configuration of the spray will affect drift distance. For example, changing the spray direction and height from a vertical spray direction to a flatter, more horizontal direction (with resulting greater area) results in a substantially decreased drift distance.

In addition, the system also takes into account the effects of wind speed and direction and humidity. Testing has resulted in a model to estimate drift distance from all the above factors (see FIGS. 5-8). The system detects ambient humidity (with humidity sensors) and wind speed and direction (with an anemometer) in the vicinity of the evaporator module and/or pit and controls the water velocity at the nozzle to control flowrate, thereby controlling the drift distance. For produced water applications, where evaporation takes place in large surface impoundments or pits, the system controls the drift distance so the mist and salts settle within the pit, and do not move to surrounding land. This ultimately concentrates the water in the impoundment for later disposal, thereby enhancing natural evaporation and increasing the water management capacity of the product water treatment program, ultimately reducing the volume of water requiring disposal.

Figure 1:
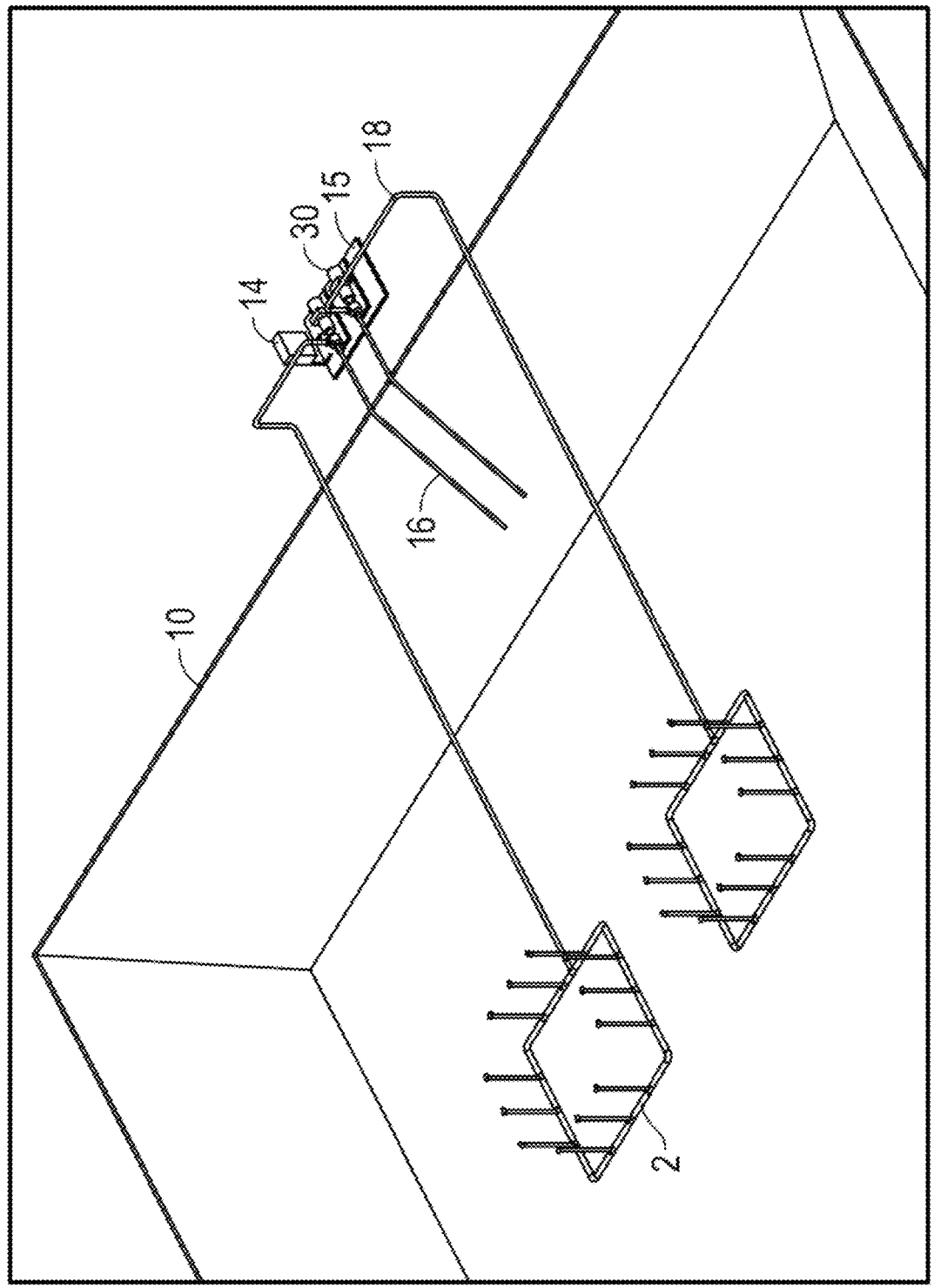
FIG. 1 shows an example of a two evaporator module system.
Figure 2:
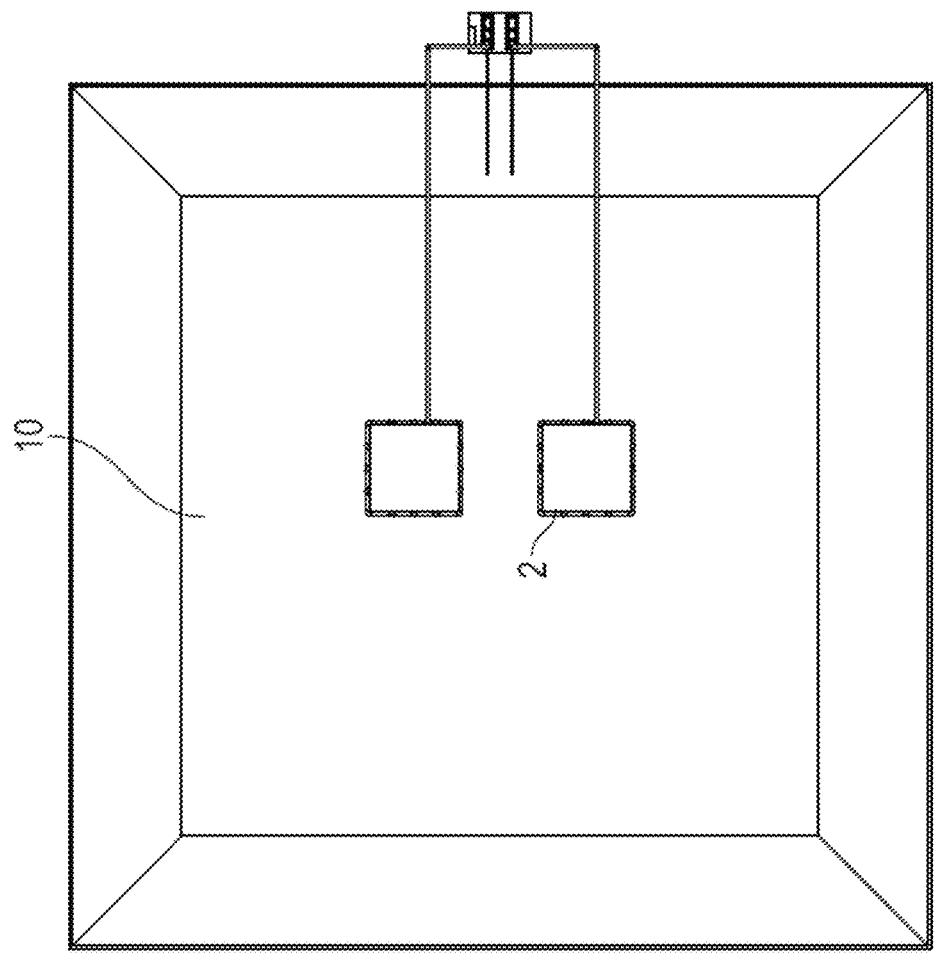
FIG. 2 shows an overhead view of FIG. 1.

FIGS. 1 and 2 show an example of a two-module system. Two evaporator modules 2 are placed in the produced water in a large surface impoundment or pit 10. The control system may be mounted on a trailer 15 so the system can be easily moved from location to location. The automation control panel 14 includes the humidity and wind speed and direction sensors/devices, and controls the operation of the water pumps 30. The pumps intake water from the pit through water suction lines 16 and send water to the evaporator modules through water supply lines 18. For quality control, surface samples are taken from around the pit and analyzed for salinity and/or the presence of other contaminants.

Figure 3:
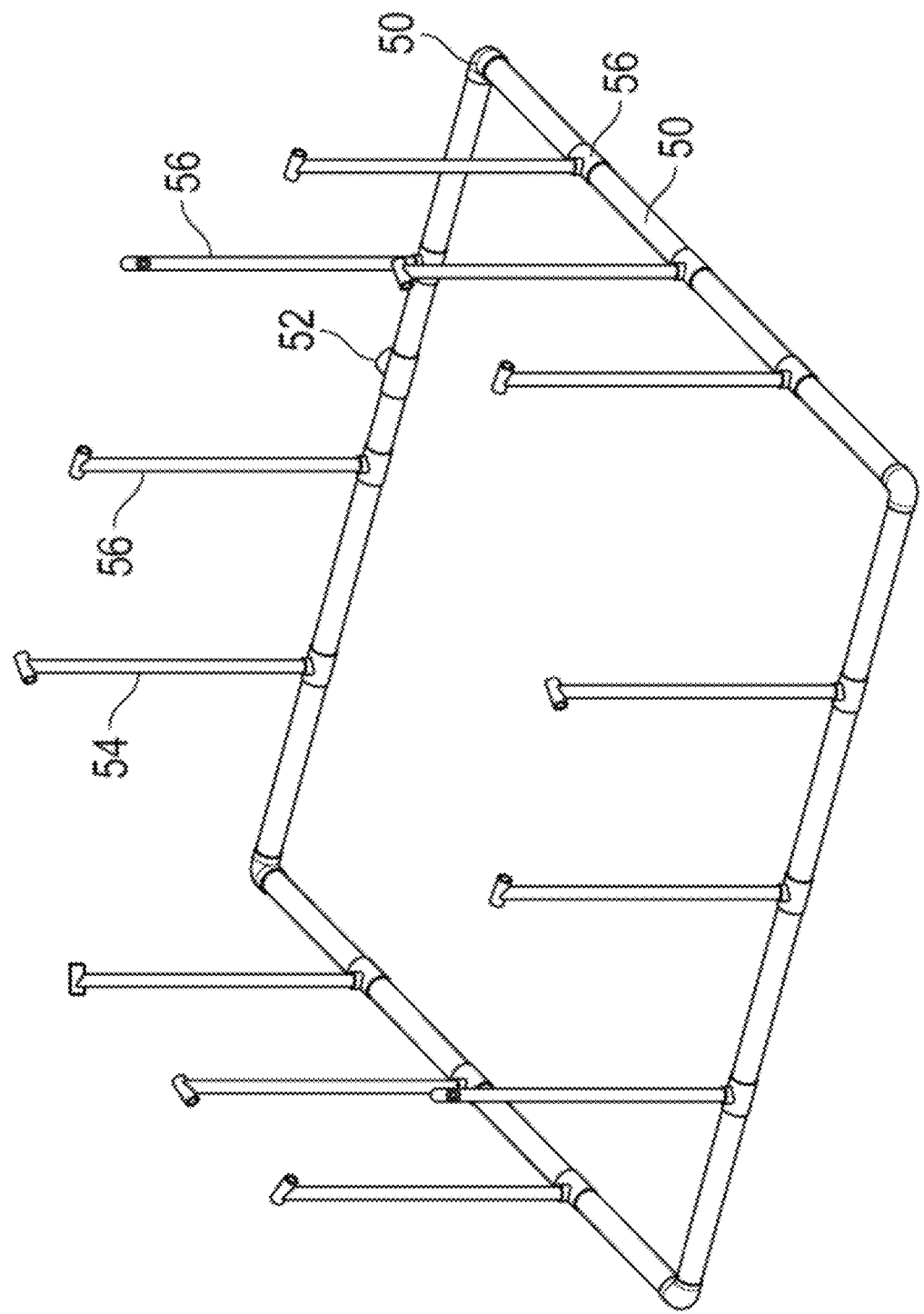
FIG. 3 shows a detail of a square-frame evaporator module.

FIG. 3 shows one example of an evaporator module. The rectilinear base comprises pipe 50 that receive water from the pit through inlet 52 which is connected to water supply lines 18. Vertical pipes or risers 54 are connected (such as by reducing tees 56) to the base pipe 50, and extend upward to nozzles 56, which spray the pit water as described above.

Figure 4:
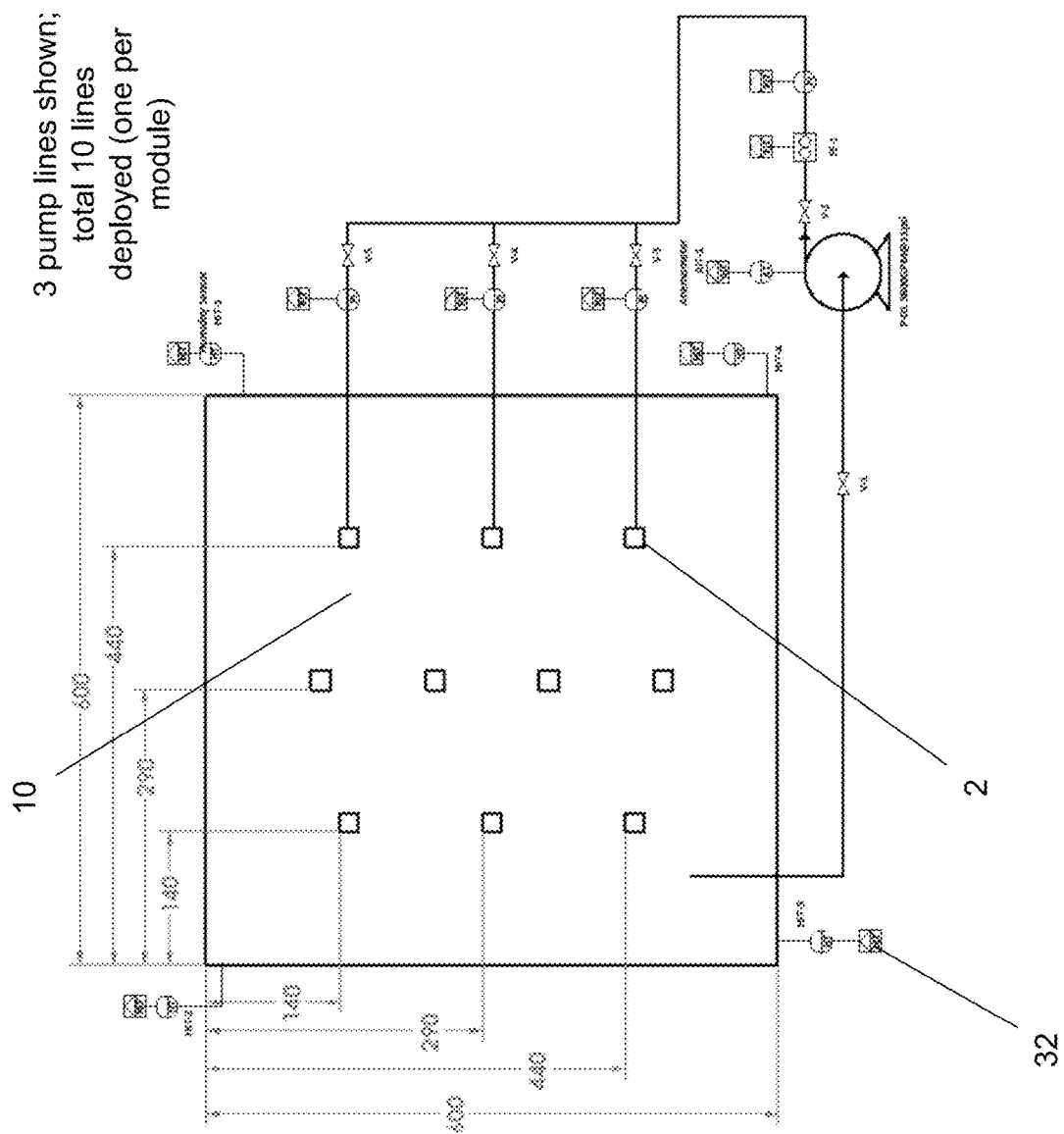
FIG. 4 shows an example of a ten evaporator module system.

On a larger scale, multiple evaporator modules 2 may be placed in a larger pit 10, as seen in FIG. 4. Humidity sensors 32 are located at various locations around the pit (four sensors are shown in FIG. 4, proximate each corner, although other locations may be used). Each module 2, or group of modules, may be controlled separately, so that individual modules or groups of modules can have different configurations and flowrates (and nozzle velocities). For example, modules in the center of the pit may be configured to have higher flowrates (and/or more vertical spray heights) than modules around the perimeter of the pit. Similarly, modules that are downwind and closer to the edge of the pit can be controlled so that drift distance is substantially lower than for other modules in the pit. Under certain conditions (i.e., high wind speed, very close to edge), the modules may be turned off completely. Conversely, modules that are upwind can have higher drift distances, as the wind will drive the mist towards the center of the pit.

Figure 7:
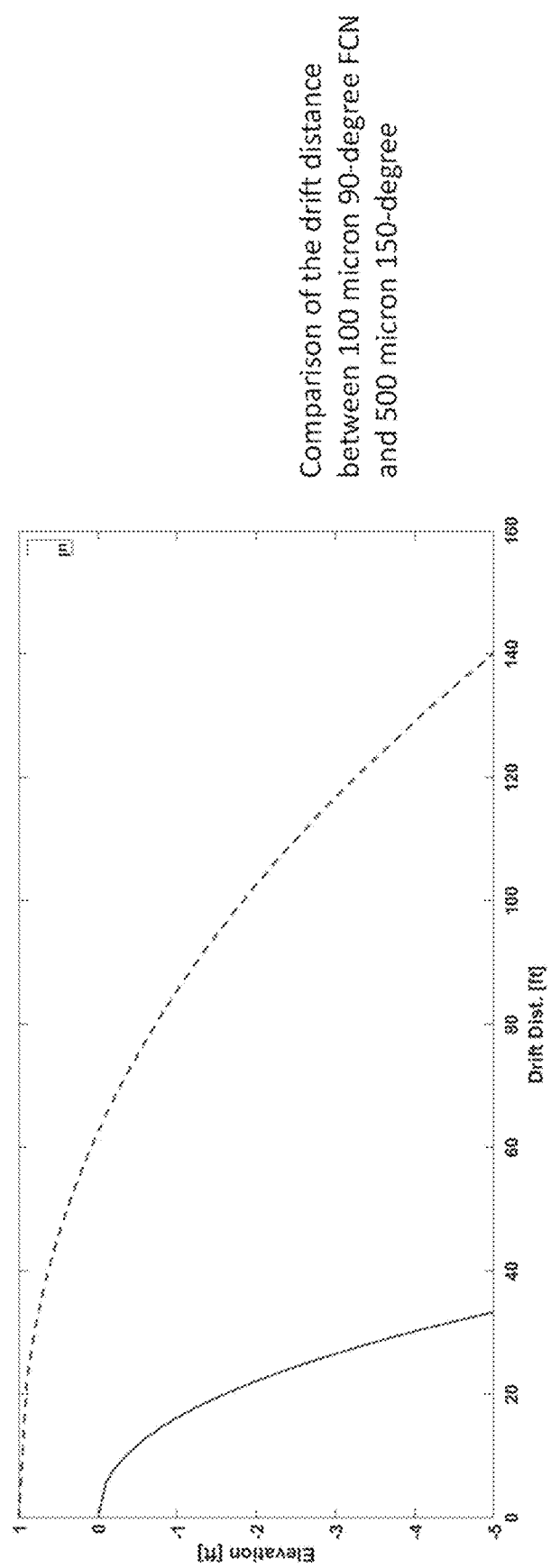
FIGS. 7 and 8 show drift distance as a function of spray cone angle and wind direction.
Figure 8:
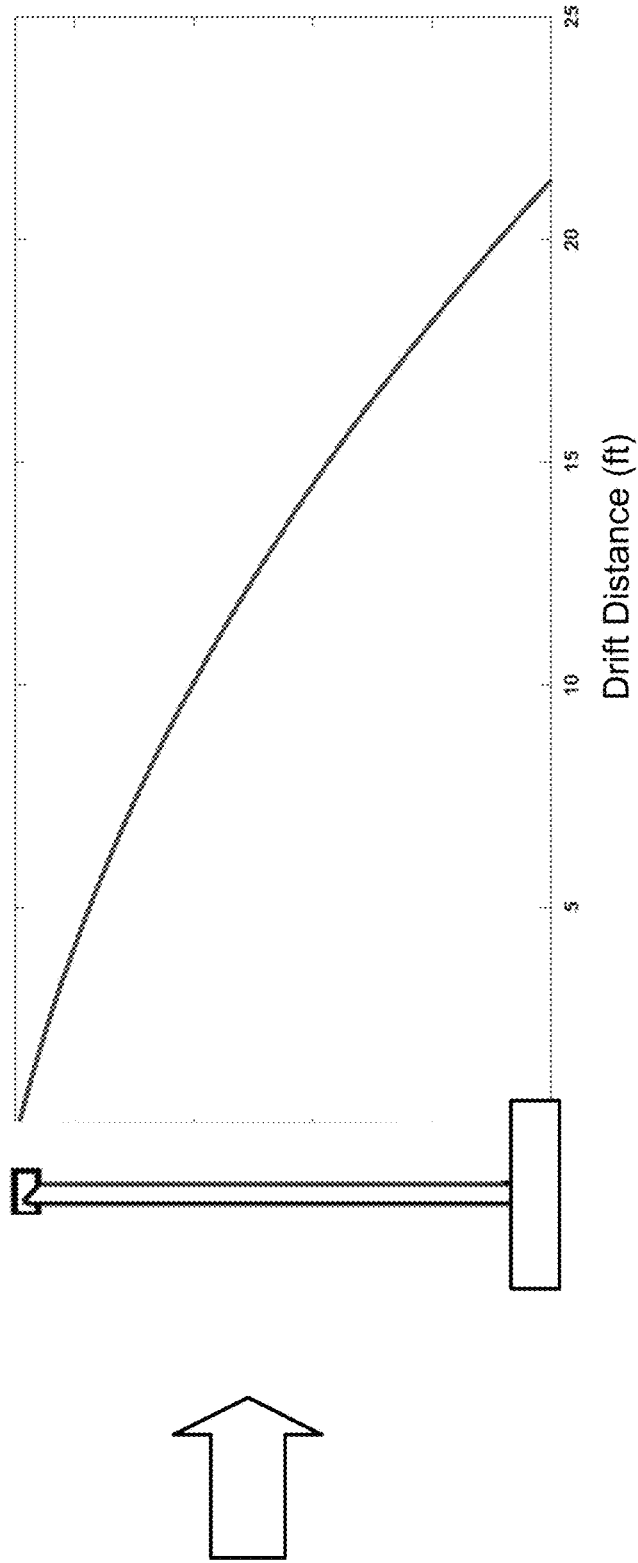

FIG. 5 shows an example of a drift distance determination based on wind speed, nozzle height, relative humidity, temperature, droplet size, and nozzle velocity. FIG. 6 shows examples of spray cone angles (e.g., 60 degrees, 90 degrees, 150 degrees, and 170 degrees) and widths. FIGS. 7 and 8 show drift distance as a function of spray cone angle and wind direction.

Figure 9:
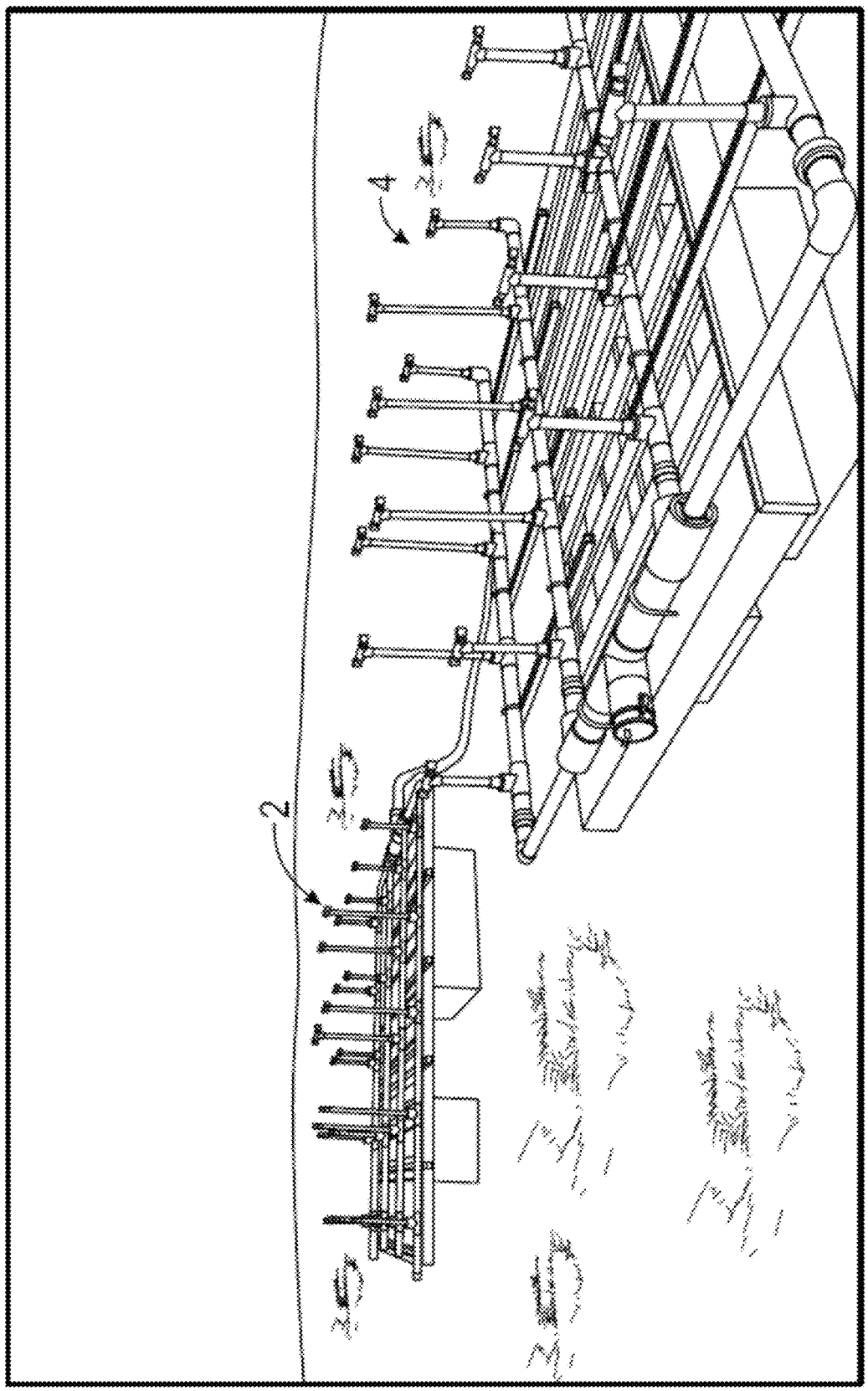
FIG. 9 shows two modules prior to installation.

FIG. 9 shows two modules 2 prior to installation. The modules are being placed on floats 4 so as to stay on top of the pit water. The floats and modules will be affixed in place in the pit during installation.

Figure 10:
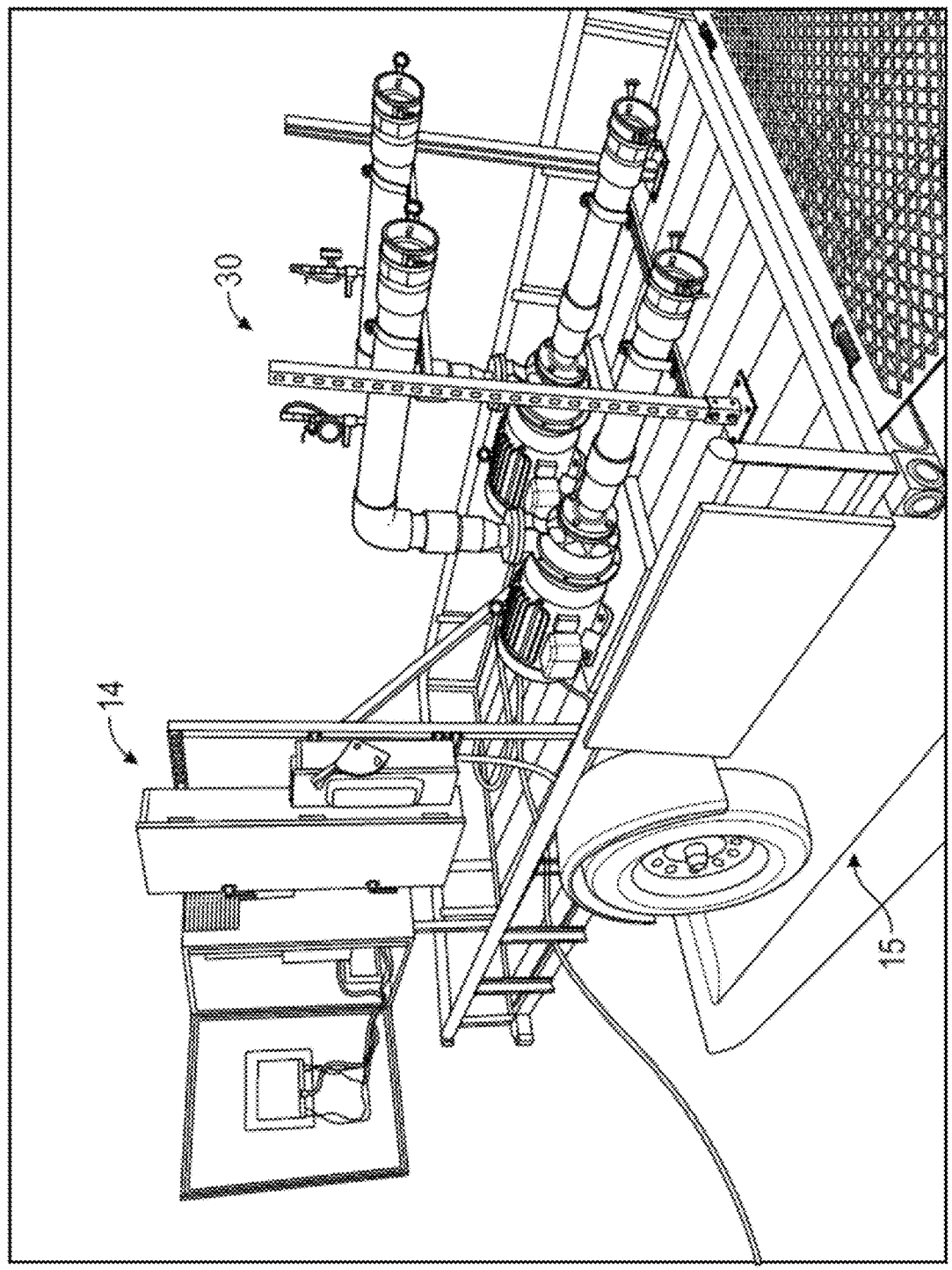
FIG. 10 shows a trailer with two pumps and a control panel.
Figure 11:
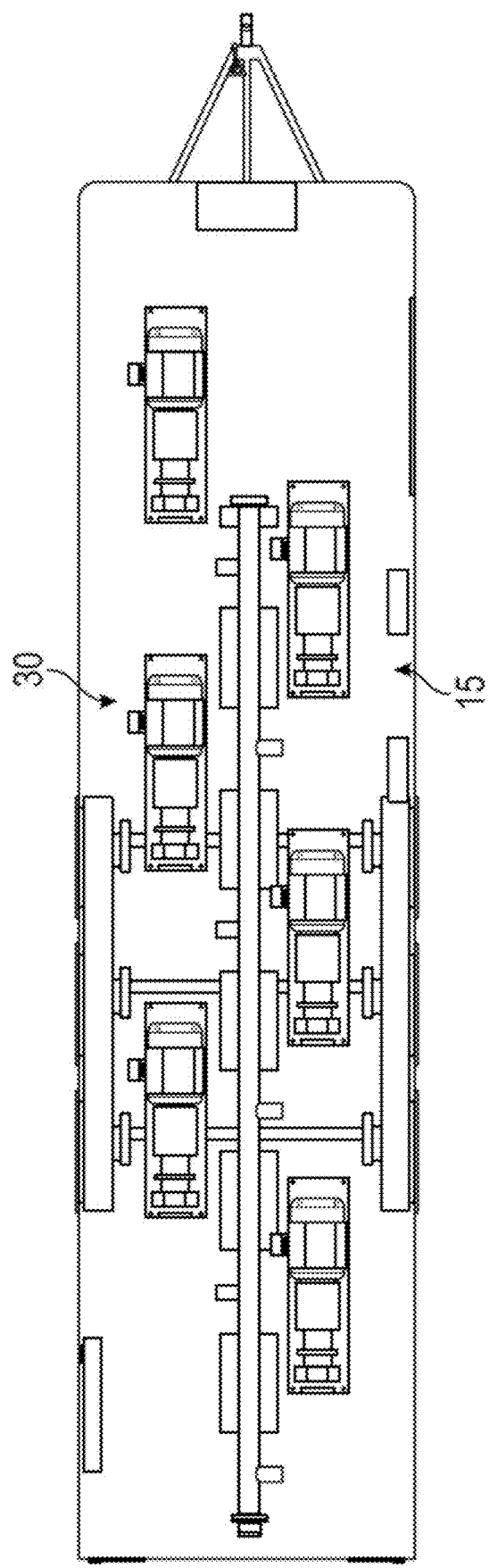
FIG. 11 shows a schematic of a six-pump trailer.

FIG. 10 shows a control system mounted on a trailer 15 with two pumps 30. The control system and pumps may remain on the trailer during operation so the system can be easily moved from location to location around the pit. The automation control panel 14 includes the humidity and wind speed and direction sensors/devices, and controls the operation of the water pumps 30. FIG. 11 shows a schematic of a six-pump enclosed trailer 15.

Figure 12:
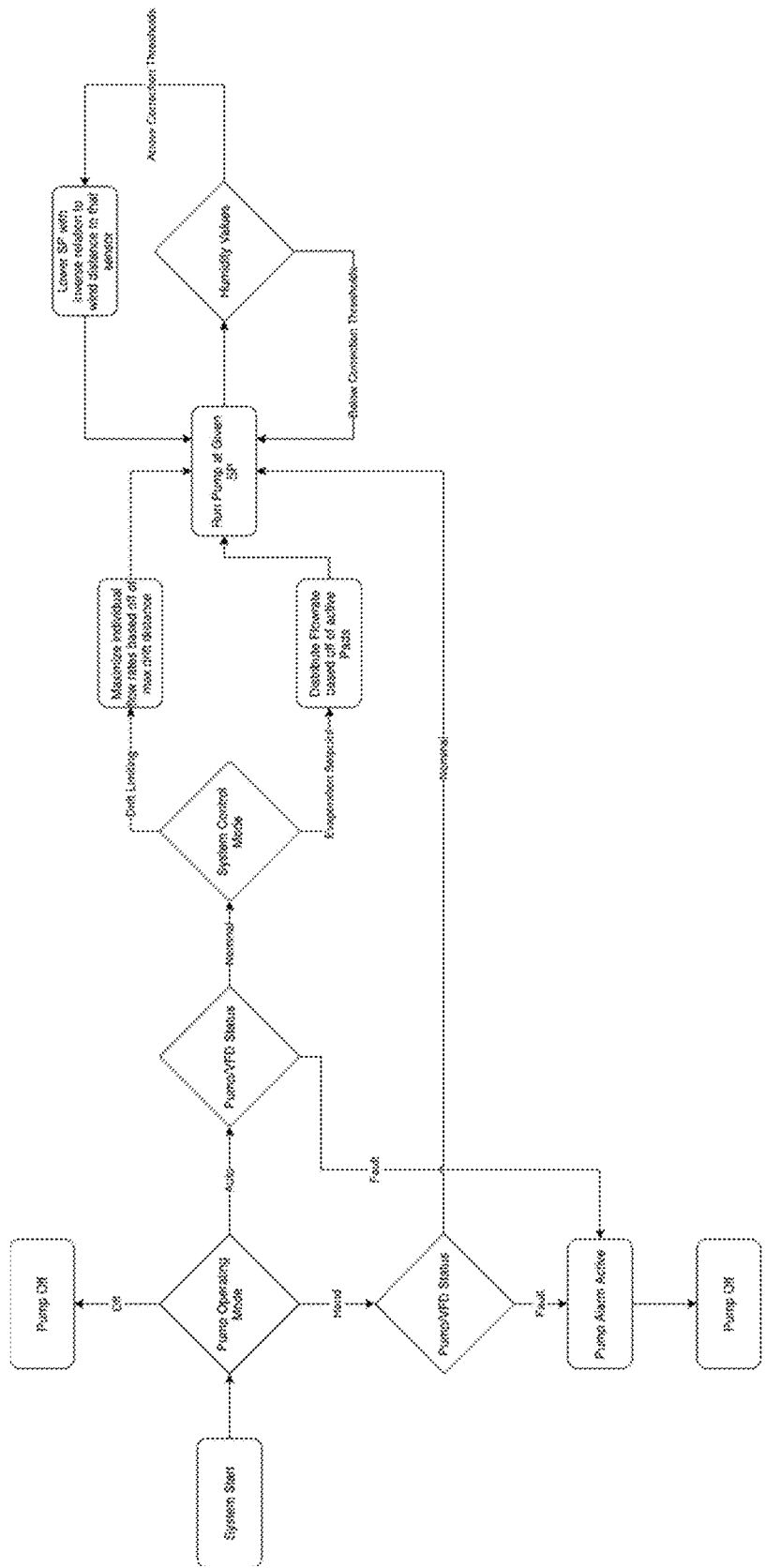
FIG. 12 is a diagram of the operation of a system in accordance with an exemplary embodiment.
Figure 13:
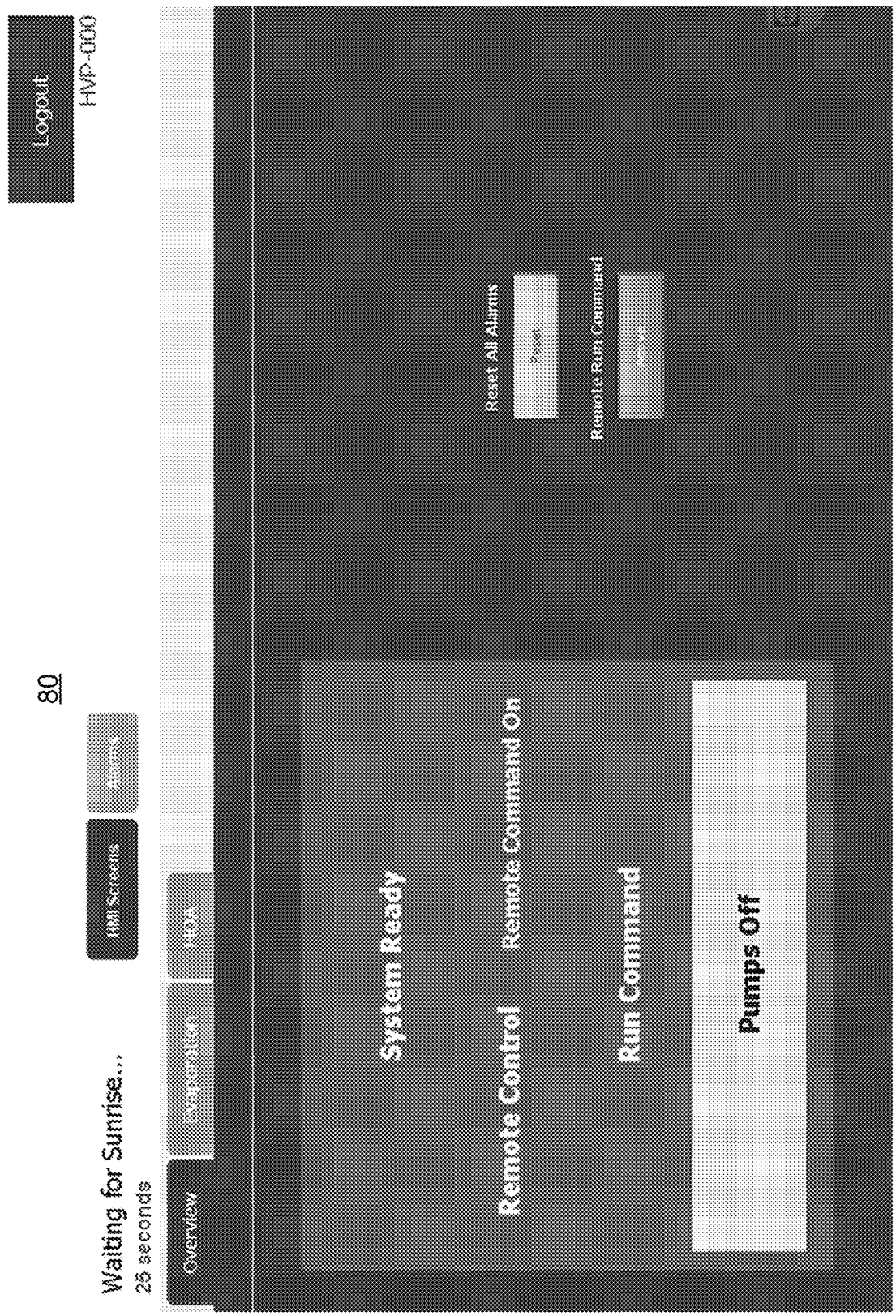
FIG. 13 shows an overview screen from a control application program.
Figure 14:
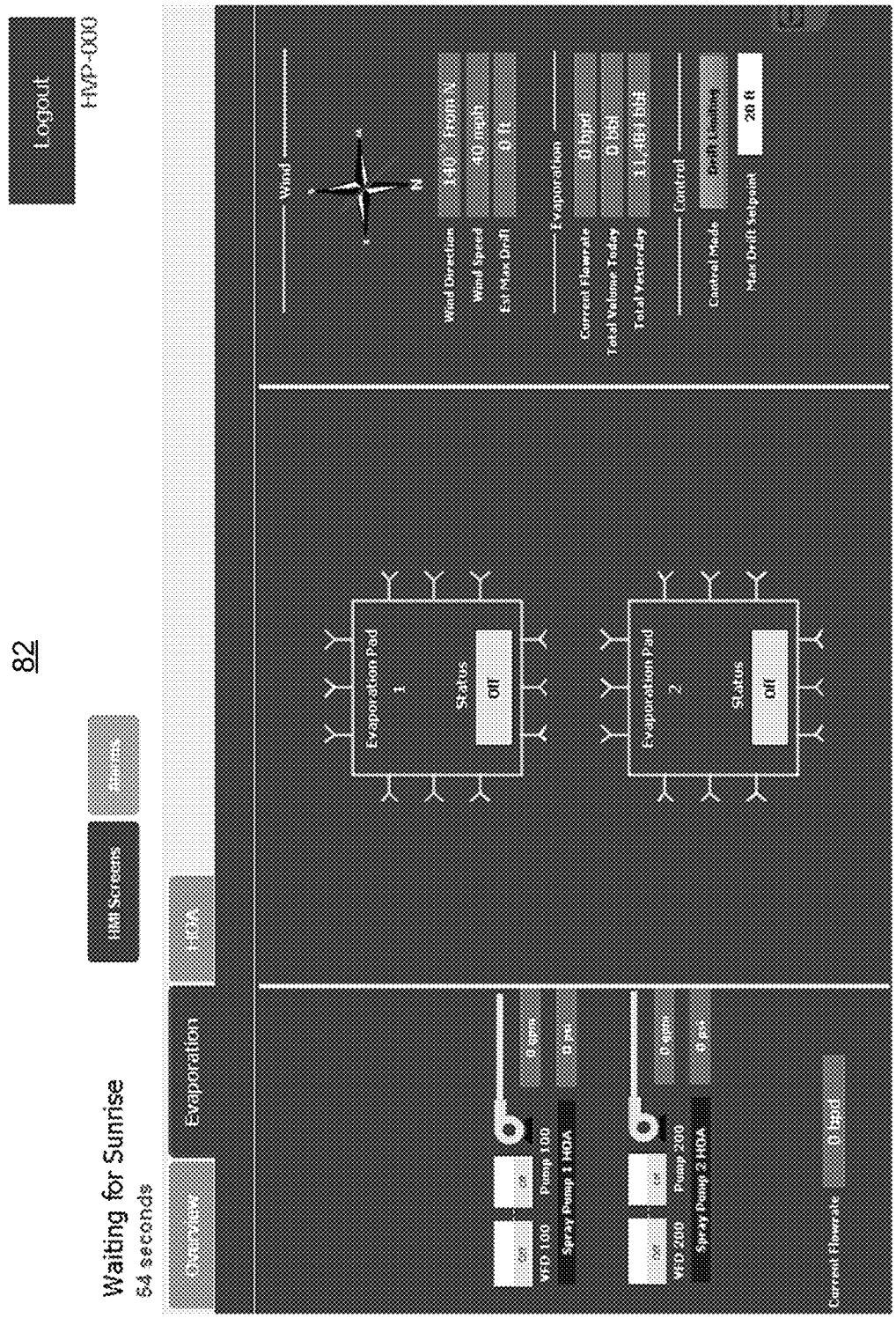
FIG. 14 shows a dashboard from a control application program.
Figure 15:
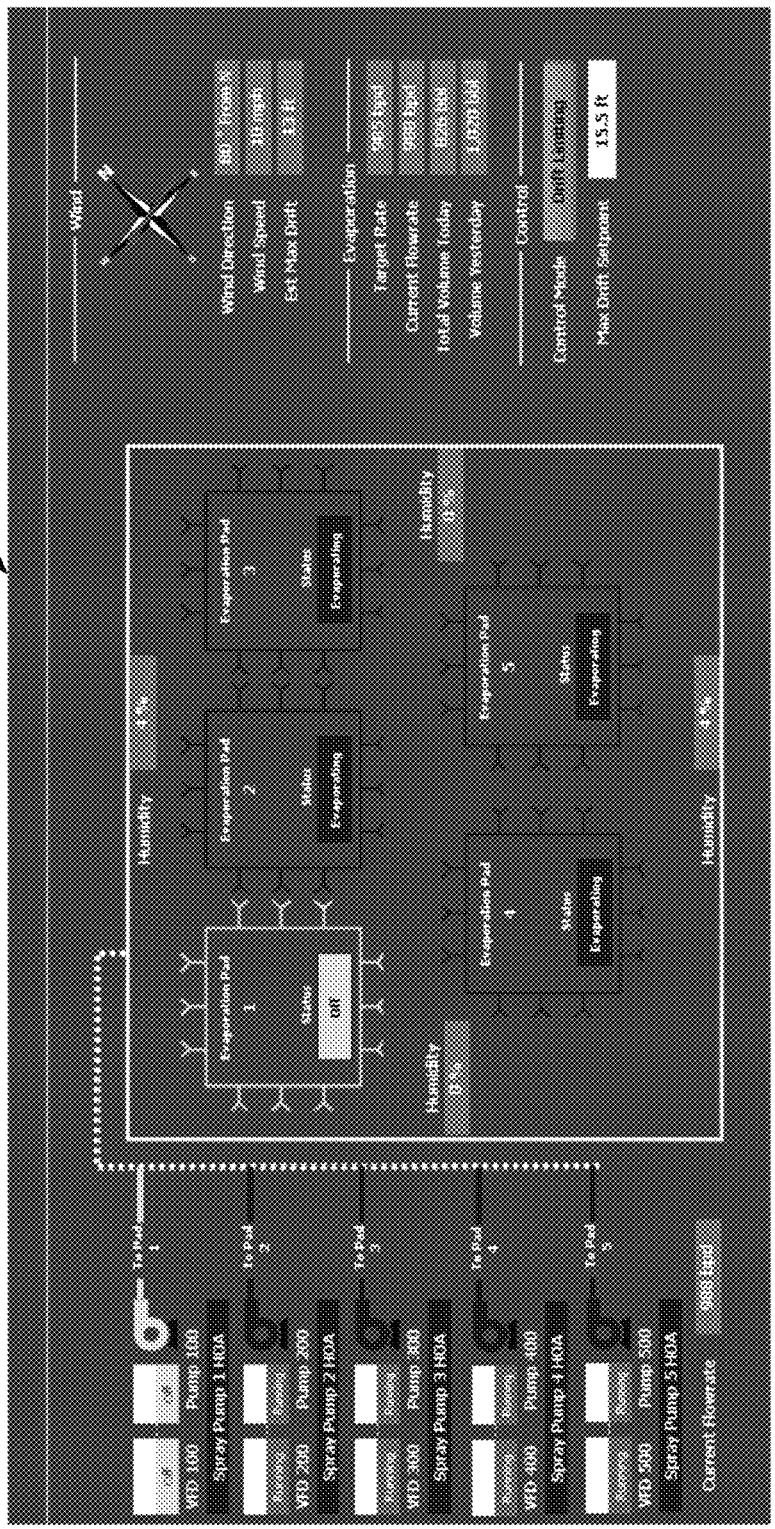
FIG. 15 shows a multi-pump/module dashboard from a control application program.

FIG. 12 is a diagram of the operation of a system in accordance with an exemplary embodiment. FIG. 13 shows an overview screen 80 from a control application program. FIG. 14 shows the evaporation dashboard from a control application program. It shows pump status, evaporation module status, wind data, evaporation data, and control mode (e.g., "Drift Limiting" mode) and a maximum drift distance setpoint (e.g., 20 feet). FIG. 15 shows the evaporation dashboard for a multi-pump and evaporation module operation (similar to FIG. 14).

Figure 16:
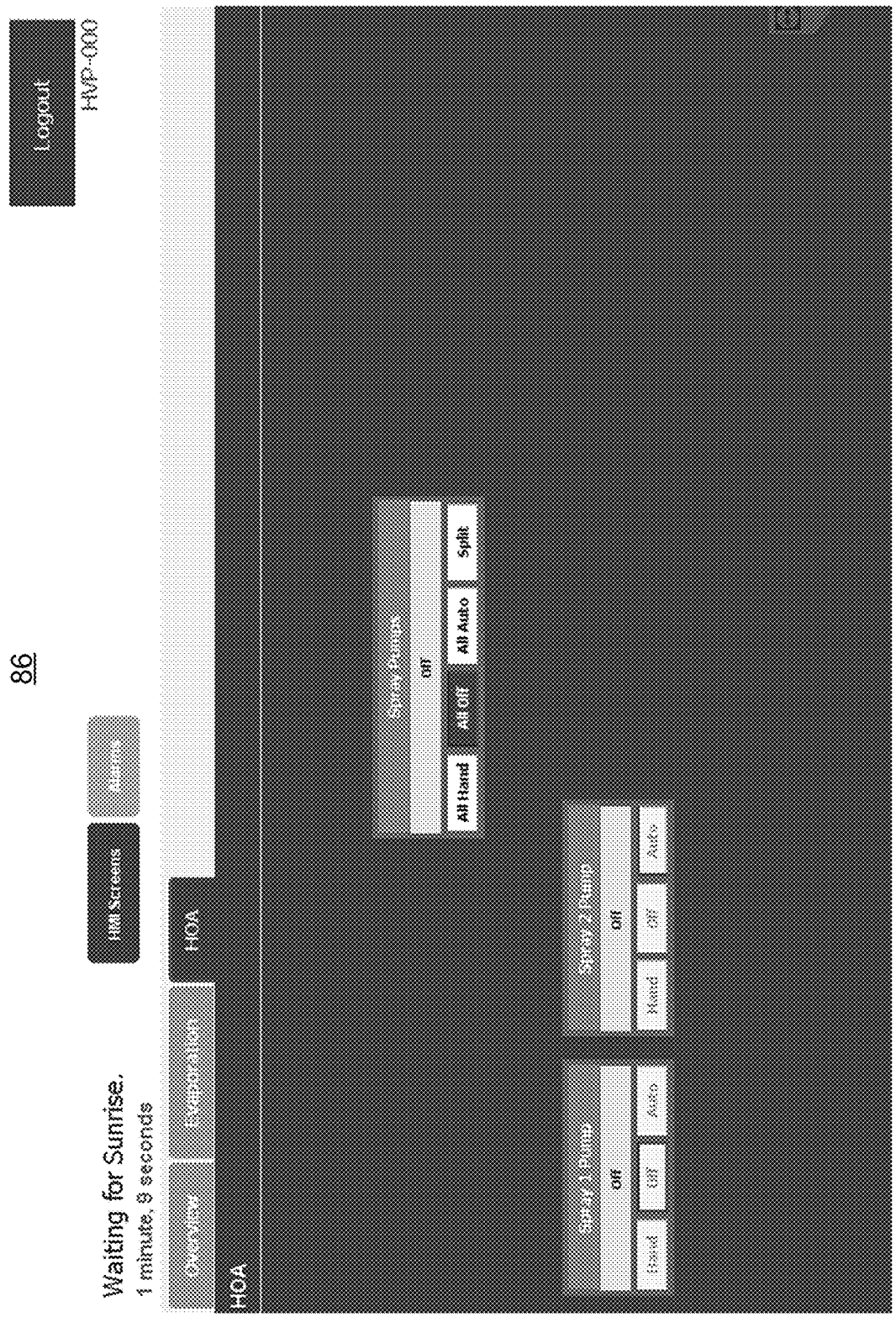
FIG. 16 shows an alarm screen from a control application program.
Figure 17:
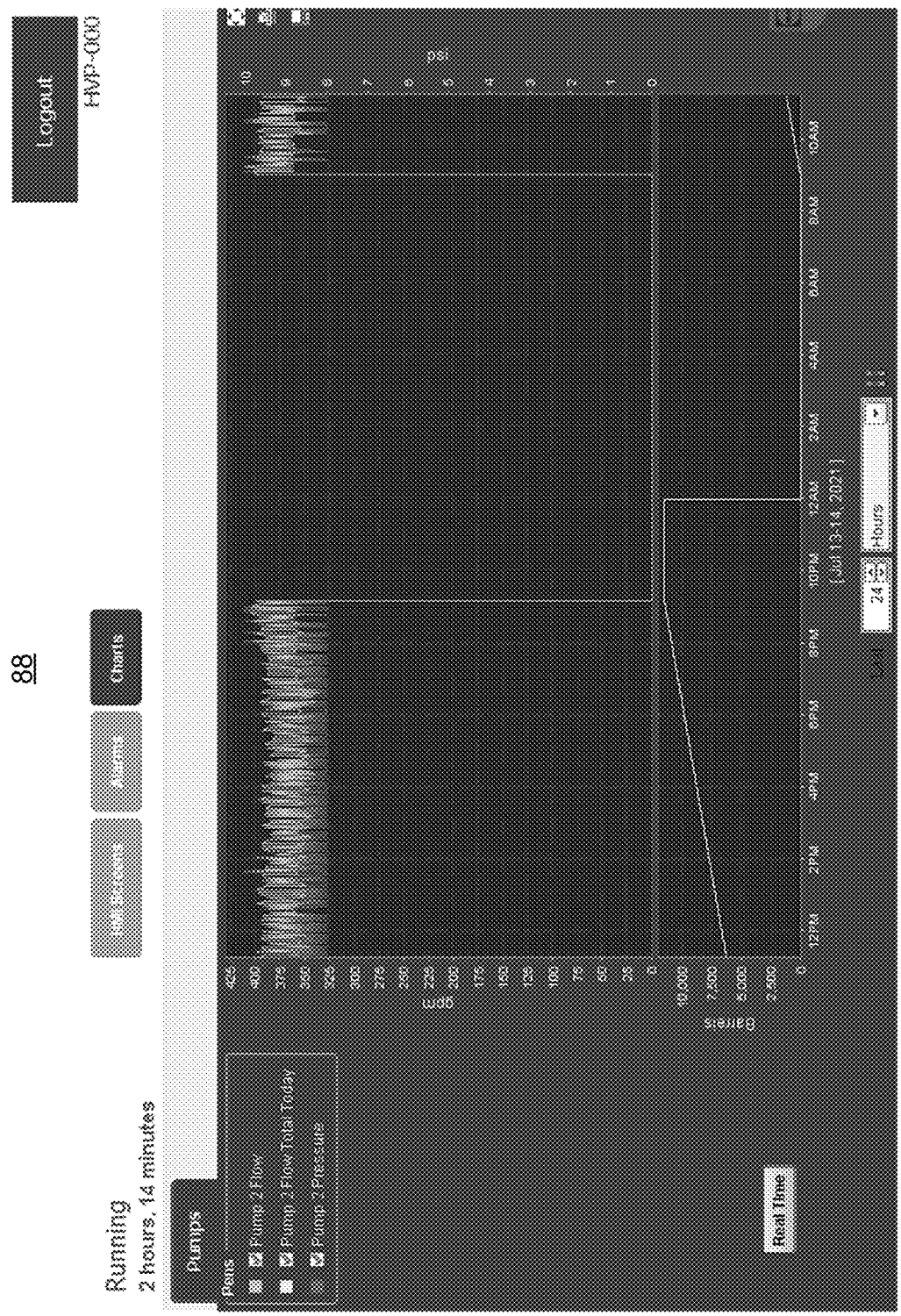
FIG. 17 shows a pump chart from a control application program.
Figure 18:
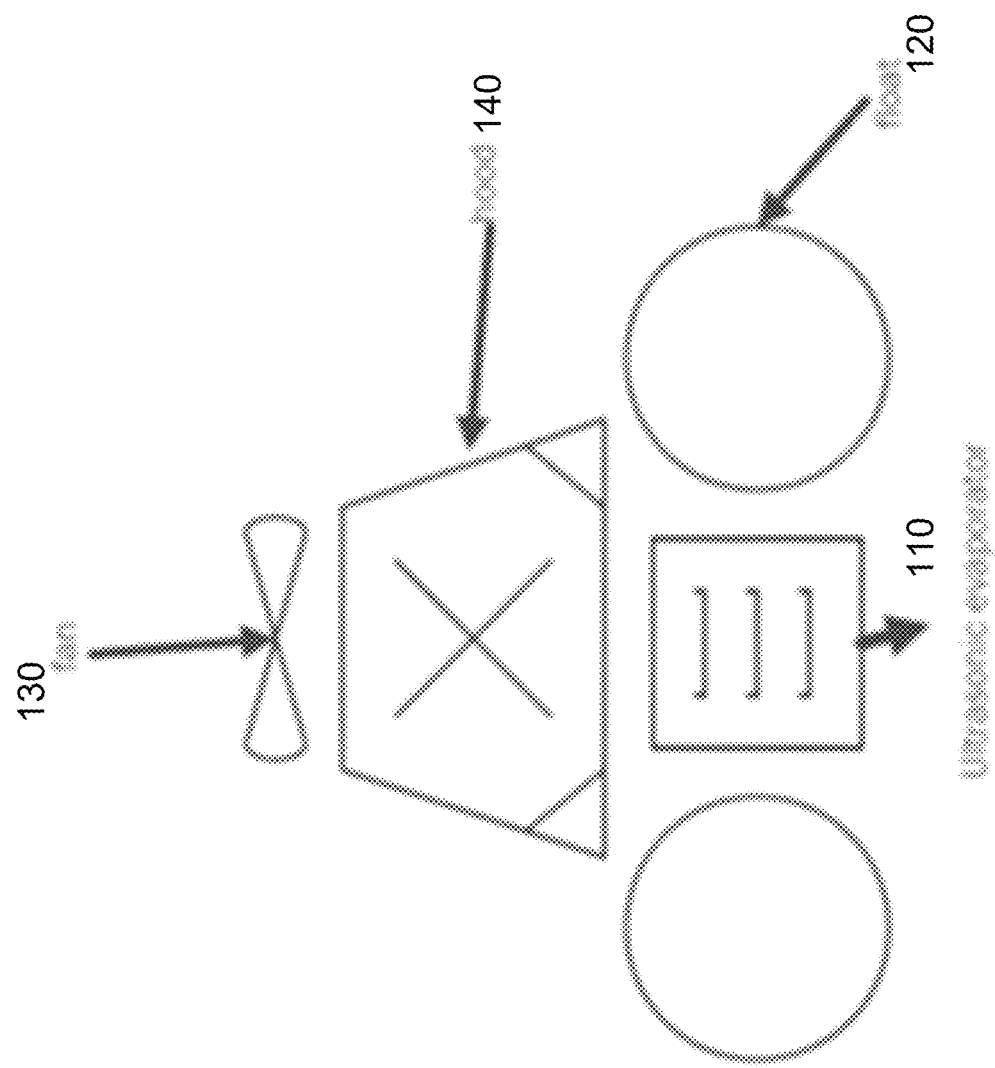
FIG. 18 is a side view of a floating evaporator unit.
Figure 19:
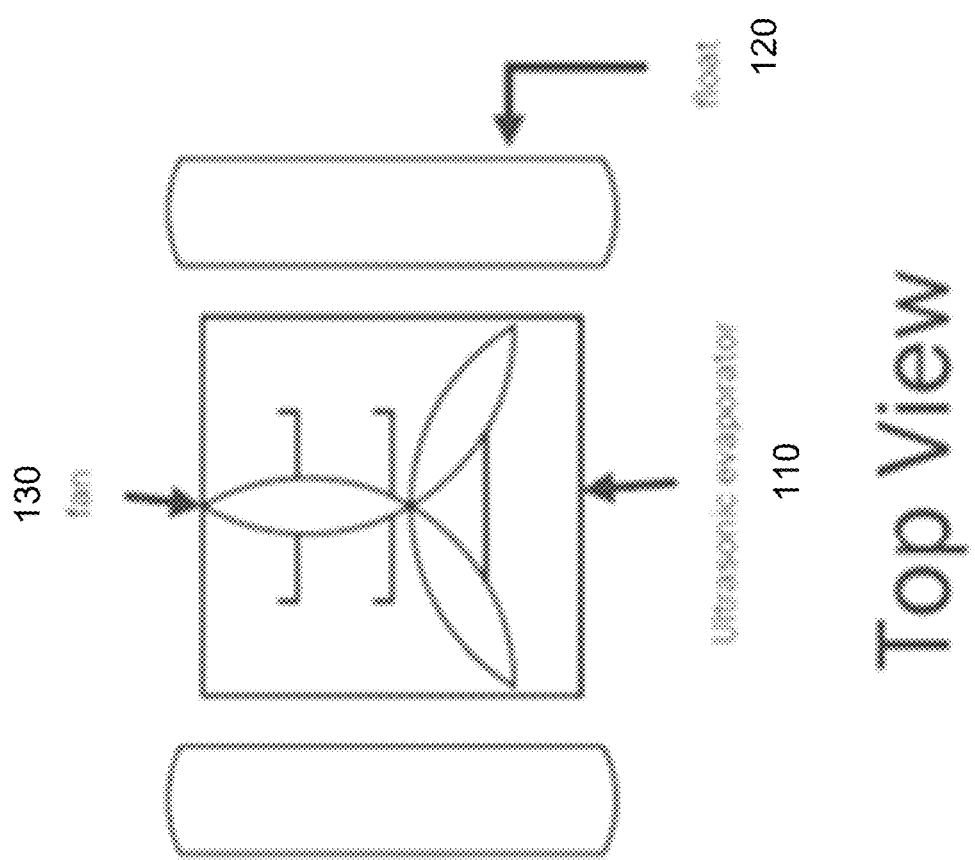
FIG. 19 is a top view of the unit of FIG. 18.

FIG. 16 shows an alarm screen 86. FIG. 17 shows a pump chart 88 for a pump used in operations.

The present invention almost may use ultrasonic evaporation techniques and mechanisms. Ultrasonic vaporizers convert electricity into vibrations by using a piezoelectric transducer. If the electrical potential is alternated at high frequencies, electrical energy is converted to mechanical vibration (sound) energy. At sufficiently high alternating potential, high frequency sound (ultrasound) will be generated. The minimum frequency to generate a water mist is 2 MHz. The water above the piezoelectric transducer is atomized and compressed at a high frequency cycle, and water mist is produced in this process. This is the basic mechanism for water mist generation by ultrasonic vibration.

The quantity of mist is directly proportional to the intensity of ultrasonic wave, while the size of mist droplets is proportional to the frequency of ultrasonic wave and the surface tension of liquid. The water is vaporized by micro-shock waves, cavitation and instability of the liquid surface wave. This vaporization allows the separation of dissolved solids and suspended solids from produced water.

Ultrasonic evaporation allows the water vapor to leave the surface, while separating the water from dissolved and suspended solids. This reduces the concern over surface evaporation spreading contaminants, primarily salts in the form of dissolved solids. This vapor is also closer to ambient temperature allowing it to be condensed in other applications.

As seen in FIGS. 18-21, in several embodiments of the present invention a floating module of ultrasonic transducers or evaporators 110 is utilized, while keeping the transducers 110 submerged wholly or partially under the produced water surface in the produced water tank or pool 100, while supported by one or more floats 120 on the sides. To avoid the vapor recondensing back into the water body, a fan 130 is placed above the transducer 110 to allow the vapor/mist to be dispersed into the drier air above the unit, and thus evaporate. The unit may further comprise a small transition piece or hood 140 positioned between the ultrasonic transducer 120 and fan 130 to direct the water vapor to the fan for more efficient dispersal. As seen, the hood 140 comprises a large open bottom that collects vapor from the transducer 120, with sides sloping inwards and upwards to a smaller open top underneath the fan or hood to direct the water vapor to the fan 130, which operates in a direction that it pulls the water vapor up and through the top of the hood.

Figure 20:
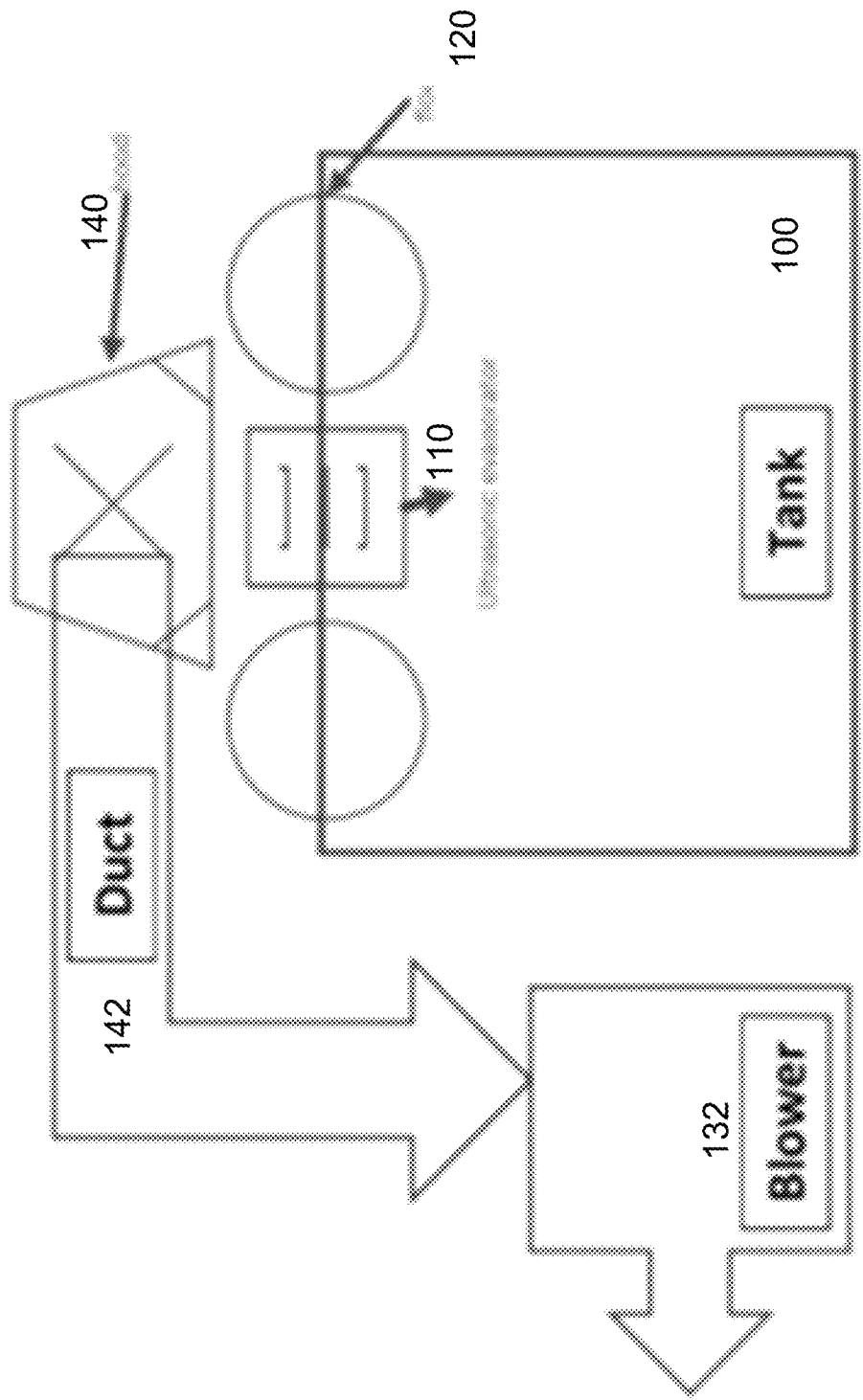
FIG. 20 is a side view of another embodiment of a floating evaporator unit.
Figure 21:
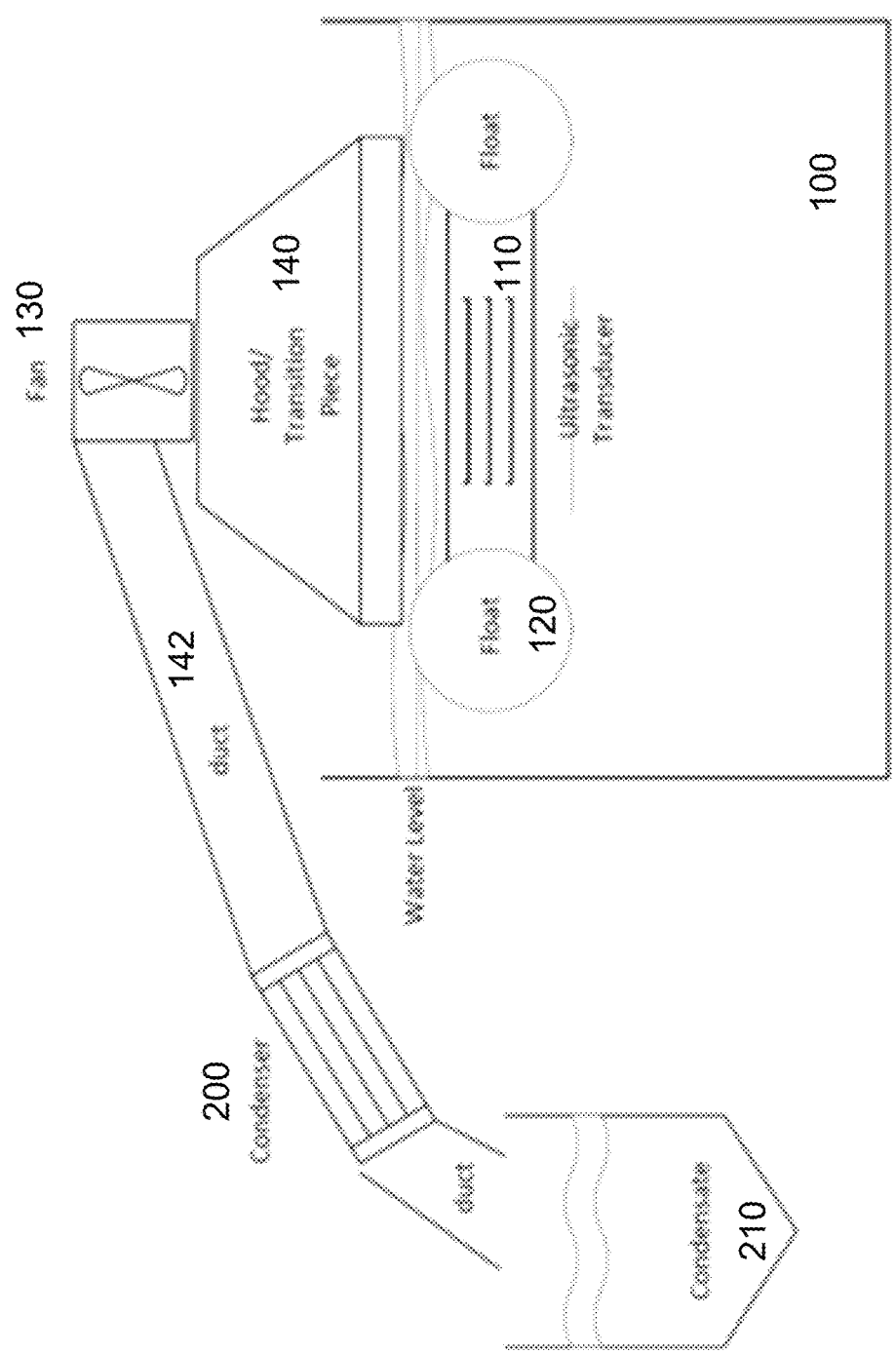
FIG. 21 is a side view of a floating evaporator unit in conjunction with a condenser.

As seen in FIG. 20, in smaller water bodies or pools, a duct 142 can be placed on the top or side of the hood/transition piece 140 to a fan/blower 132 to remove the vapor as it is produced to avoid it recondensing into the water. The fan/blower then ejects (such as through an ejection point or opening) the water vapor into an appropriate area for dispersal. As seen in FIG. 21, the fan/blower may be positioned on top of the hood, and discharge into the duct as opposed to pulling vapor through the duct, as in FIG. 20.

FIG. 21 shows yet a further embodiment for produced water desalination, as contrasted with evaporation. In this device, the water mist is condensed in a condensation chamber or device 200, taking advantage of the low temperature of the water mist and the low energy required to return the vapor to liquid (i.e., condensate 210). In the initial vaporization stage, the water is vaporized and thus separated from dissolved and suspended solids, then drawn through the fan, and discharged through a duct to the condenser. The vaporization/separation stages results in a significantly cleaner condensate. This condensate may be collected, and may either meet discharge or agricultural reuse standards or simply require conventional treatment to meet said standards. Typical condensate from produced water does not meet these standards, and treatment usually is not cost effective.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An improved surface evaporation system, comprising:
one or more ultrasonic evaporator modules floating on or proximate the surface of water in a treatment pit, said one or more ultrasonic evaporator modules comprising two or more floats with one or more piezoelectric transducers supported therebetween below the surface of said water, with a fan placed above the surface of the said water and above the one or more piezoelectric transducers;
wherein each of said one or more ultrasonic evaporator modules is configured to convert water from the treatment pit into water vapor for dispersal into a dispersal area over or proximate the treatment pit.

2. The system of claim 1, further comprising one or more evaporator modules comprising a float or floats supporting a plurality of spray nozzles extending vertically upward therefrom, wherein the direction of dispersal and distance of dispersal is controlled based on ambient conditions and dispersal parameters. wherein said ambient conditions include ambient humidity, wind speed, and wind direction.

3. The system of claim 2, wherein said dispersal parameters include water droplet size.

4. The system of claim 3, wherein water droplet size is controlled by spray nozzle size.

5. The system of claim 2, wherein said dispersal parameters include one or more of spray nozzle size, spray nozzle height above the float or floats, spray nozzle velocity, spray cone angle, and position of the evaporator module in the pit.

6. The system of claim 1, wherein the water is produced water.

7. The system of claim 2, wherein the direction of dispersal and distance of dispersal for each of said one or more evaporator modules is controlled independently of other evaporator modules.

8. The system of claim 2, wherein the direction of dispersal and distance of dispersal for each of said one or more evaporator modules is controlled to prevent the water vapor from dispersing beyond the treatment pit edges.

9. The system of claim 1, further comprising a hood above the ultrasonic transducers, said hood comprising a large open bottom, a smaller open top, with sides sloping inwards and upwards from the bottom to the top, wherein the fan is configured to draw water vapor up and through the hood.

10. The system of claim 9, further comprising a duct and blower configured to cause the water vapor to flow from the hood through the duct to an ejection point.

\* \* \* \* \*